United States Patent
Rohn et al.

(10) Patent No.: US 6,290,761 B2
(45) Date of Patent: *Sep. 18, 2001

(54) FILTER FOR VACUUM CLEANER

(75) Inventors: Dean Rohn, Cadillac; John J. Alberts, III, Stanwood; Alan Joseph Krebs, Pierson; Roy Oliver Erickson, deceased, late of Cadillac, all of MI (US), by Loretta Ann Erickson, legal representative

(73) Assignee: Rexair, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/732,149

(22) Filed: Dec. 7, 2000

Related U.S. Application Data

(63) Continuation of application No. 09/298,137, filed on Apr. 23, 1999, now Pat. No. 6,162,287.

(51) Int. Cl.$^7$ .................................................. B01D 47/02
(52) U.S. Cl. .............................. 96/333; 96/337; 15/353; 55/DIG. 3
(58) Field of Search ........................ 15/353, 347; 95/226; 55/DIG. 3; 96/351, 333, 334, 342, 348, 329, 340, 337, 338, 339

(56) References Cited

U.S. PATENT DOCUMENTS

| | | | | |
|---|---|---|---|---|
| 2,102,353 | * | 12/1937 | Brock | 96/334 |
| 2,184,731 | * | 12/1939 | Brewer | 96/337 |
| 2,189,021 | * | 2/1940 | Schury | 96/334 |
| 2,221,572 | * | 11/1940 | Brock et al. | 96/333 |
| 2,945,553 | * | 7/1960 | Brock | 96/333 |
| 2,954,095 | * | 9/1960 | Brock | 96/342 |
| 3,234,713 | * | 2/1966 | Harper et al. | 96/342 |
| 3,279,157 | | 10/1966 | Andersson-Sason . | |
| 3,609,946 | | 10/1971 | Nakagawa et al. . | |
| 3,841,067 | | 10/1974 | Kato et al. . | |
| 4,036,346 | | 7/1977 | Livingston . | |
| 4,342,131 | | 8/1982 | Reid . | |
| 4,547,206 | * | 10/1985 | Sovis et al. | 55/DIG. 3 |
| 4,693,734 | * | 9/1987 | Erickson, Jr. | 96/333 |
| 4,838,907 | | 6/1989 | Perry . | |
| 4,851,017 | * | 7/1989 | Erickson et al. | 96/351 |
| 5,022,115 | * | 6/1991 | Kasper | 96/333 |
| 5,030,257 | * | 7/1991 | Kasper et al. | 96/333 |
| 5,090,974 | * | 2/1992 | Kasper et al. | 96/333 |
| 5,096,475 | * | 3/1992 | Kasper et al. | 96/333 |
| 5,125,129 | * | 6/1992 | Kasper et al. | 96/333 |
| 5,199,963 | * | 4/1993 | Scarp | 55/DIG. 3 |
| 5,259,087 | | 11/1993 | Loveless et al. . | |
| 5,280,666 | | 1/1994 | Wood et al. . | |
| 5,301,388 | | 4/1994 | Zeren . | |
| 5,339,487 | | 8/1994 | Kasper . | |
| 5,388,301 | | 2/1995 | Bosyj et al. . | |
| 5,535,500 | | 7/1996 | Stephens et al. . | |
| 5,537,710 | | 7/1996 | Selewski et al. . | |
| 5,752,997 | * | 5/1998 | Roth | 55/DIG. 3 |
| 5,961,677 | * | 10/1999 | Scott | 55/DIG. 3 |
| 6,162,287 | * | 12/2000 | Rohn et al. | 96/333 |

OTHER PUBLICATIONS

Copy of diagram of Rainbow Ultra–Low Penetrationsarrestor in German, No Date.

* cited by examiner

*Primary Examiner*—Duane S. Smith
(74) *Attorney, Agent, or Firm*—Howard & Howard

(57) ABSTRACT

A vacuum cleaner assembly includes a main housing) having an inlet, a recess and an outlet disposed within the recess. A water bath filter is coupled to the main housing and disclosed between the inlet and the single outlet. The water bath filter is for filtering the air prior to exhausting the air outwardly through the outlet. A second filter is removably disposed adjacent said main housing single outlet within the main housing recess.

13 Claims, 3 Drawing Sheets

FILTER FOR VACUUM CLEANER

This application is a continuation of U.S. patent application Ser. No. 09/298,137 entitled IMPROVED FILTER FOR VACUUM CLEANER, filed Apr. 23, 1999, now U.S. Pat. No. 6,162,287.

BACKGROUND OF THE INVENTION

1. Field of the Invention

This invention relates to a vacuum cleaner of the type for household use.

2. Description of the Prior Art

Water bath vacuum cleaners are well known and typically include a main vacuum with a removably attached water bath pan. An intake opening in the water bath pan matingly engages an inlet in the main housing of the vacuum cleaner to allow dust and dirt entrained air to be ingested by a vacuum force through the inlet into the area defined by the water bath pan. The primary advantage of the water bath filtering agent is that vacuum efficiency is not compromised as more dirt and dust is accumulated in the water bath. The dust and dirt are trapped in the water bath as the incoming air is directed into the water bath pan and circulated within. Traditional filtering media allow the flow of air through the filtering media to be impeded by the accumulation of the dirt and dust that has collected thereon. However, just as traditional filter media will allow very tiny microscopic particles to escape capture, the water bath and separator may also fail to capture all of the very small or microscopic particles that are light enough to remain suspended in the air as the air is circulated in the water bath pan.

High efficiency filters, or HEPA filters, are also widely used on vacuum cleaners in industrial and residential applications. These filters are made up of media with very tiny openings that are designed to capture the smallest microscopic particles that most traditional filtering media are incapable of capturing. The major drawback to the use of these types of filters is that due to the small size of the openings in the filter media, they capture all of the dirt and debris that hits them thereby clogging up very quickly, and requiring cleaning or replacement very often. For this reason, some vacuum cleaning products try to combine the HEPA filter with a more conventional dry filter media. The conventional dry filter media will capture the larger particles of dirt and debris, and the HEPA filter will only capture the smaller particles that escape the conventional dry filter media. The overall efficiency of the vacuum cleaner (and the conventional dry filter media) is affected as the air is redirected and routed through the additional filter. Also, the full area of the high efficiency filter is not utilized because the air is typically directed through a small opening in the main housing of the vacuum cleaner, which concentrates the flow of air on the portion of the high efficiency filter that is directly in front of the opening.

SUMMARY OF THE INVENTION AND ADVANTAGES

The present invention relates to a vacuum cleaner assembly comprising a main housing having an inlet and an outlet. A motor is disposed within the main housing between the inlet and the outlet for providing motive force to a cooling fan, a blower, and a separator. The cooling fan is mounted within the main housing above the motor to circulate cooling air around the motor. A baffle is mounted within the main housing for directing the cooling air around the motor, and to filter the air that is circulated around the motor before that air is exhausted. The blower is mounted within the main housing below the motor for drawing air into the inlet and exhausting air outwardly through the outlet. The separator is mounted below the blower for circulating the air and water within a water bath and providing, in combination with the water bath, a primary filter for filtering the air prior to exhausting the air outwardly through the outlet. A second filter is a high efficiency filter for filtering microscopic dust and dirt particles that escape the separator and water bath and is disposed after both the water bath and the separator and before the outlet for additional filtering of the air prior to being exhausted. The second filter is disposed in a recess which is integral with the main housing allowing for direct and efficient flow of the air through the water bath, separator and second filter.

Accordingly, the present invention will utilize the separator and water bath filter to capture the larger particles of dirt and debris prior to routing the air through the second high efficiency filter to capture microscopic particles that escape the water bath. The recess for the high efficiency filter is located integrally to the main housing allowing the air to flow directly from the water bath canister through the high efficiency filter with minimal redirection of the air and no noticeable impact on the primary filter. This will allow the air to flow smoothly through the series of filters. The high efficiency filter will not be overly clogged because the separator and water bath will capture the majority of the larger dust and dirt particles before the air goes through the high efficiency filter. The recess is designed to allow the majority of the surface area of the high efficiency filter to be in the direct line of air flow thereby the overall efficiency of the vacuum cleaner is maximized.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
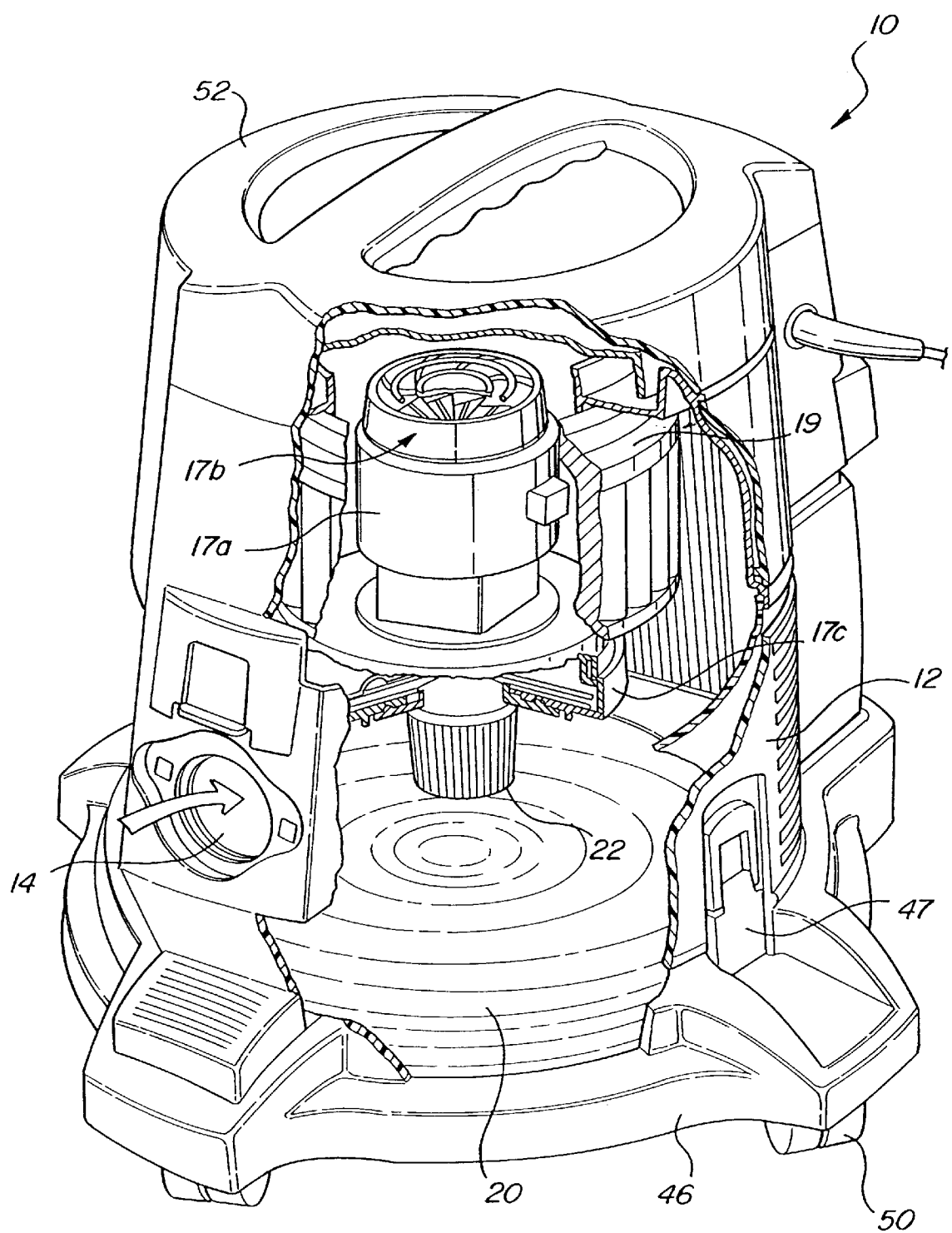
FIG. 1 is a perspective view of the vacuum cleaner assembly, partially broken away and in cross section.

Referring to the Figures, wherein like numerals indicate like or corresponding parts throughout the several views a vacuum cleaner assembly is generally shown at 10. The vacuum cleaner assembly 10 includes a main housing 12 having an inlet 14 and an outlet 16. A motor 17a is supported by support rings 18 within the main housing, 12 between the inlet 14 and the outlet 16 for providing motive force to a cooling fan 17b, a blower 17c, and a separator 22. The cooling fan 17b is mounted within the main housing 12 above the motor 17a to circulate cooling air around the motor 17a. A baffle 19 surrounds the motor 17a to direct the cooling air around the motor 17a and to filter the cooling air prior to being exhausted. The blower 17c is mounted within the main housing 12 below the motor 17a for drawing air into the inlet 14 and exhausting air outwardly through the outlet 16. The separator 22 is mounted below the blower 17c for circulating the air and a water bath 20 within a water bath pan 36 and providing, in combination with the water bath 20, a primary filter for filtering, the air prior to exhausting the air outwardly through the outlet 16. Vacuum cleaners using a water bath 20 filter are known to those skilled in the art as described in U.S. Pat. No. 5,096,475, which is hereby incorporated by reference to this specification. A second filter 24 is a high efficiency filter for filtering microscopic dust and dirt particles that escape the separator 22 and water bath 20 and is disposed after both the water bath 20 and the separator 22 and before the outlet 16 for additional filtering of the air prior to being exhausted. The main housing 12 defines a recess 26 and the second filter 24 is seated in that recess 26.

Figure 2:
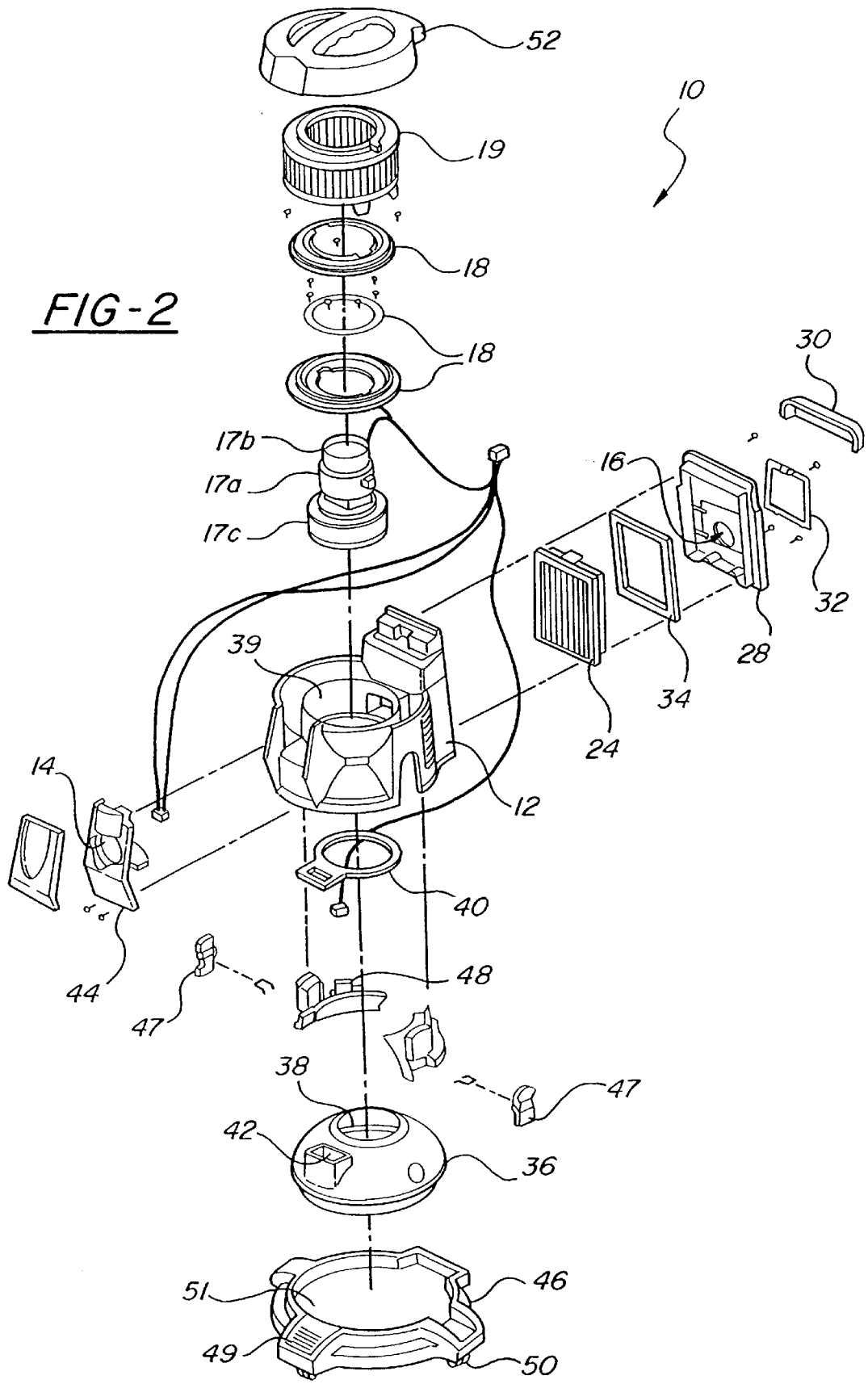
FIG. 2 is an exploded perspective view of the vacuum cleaner assembly.
Figure 3:
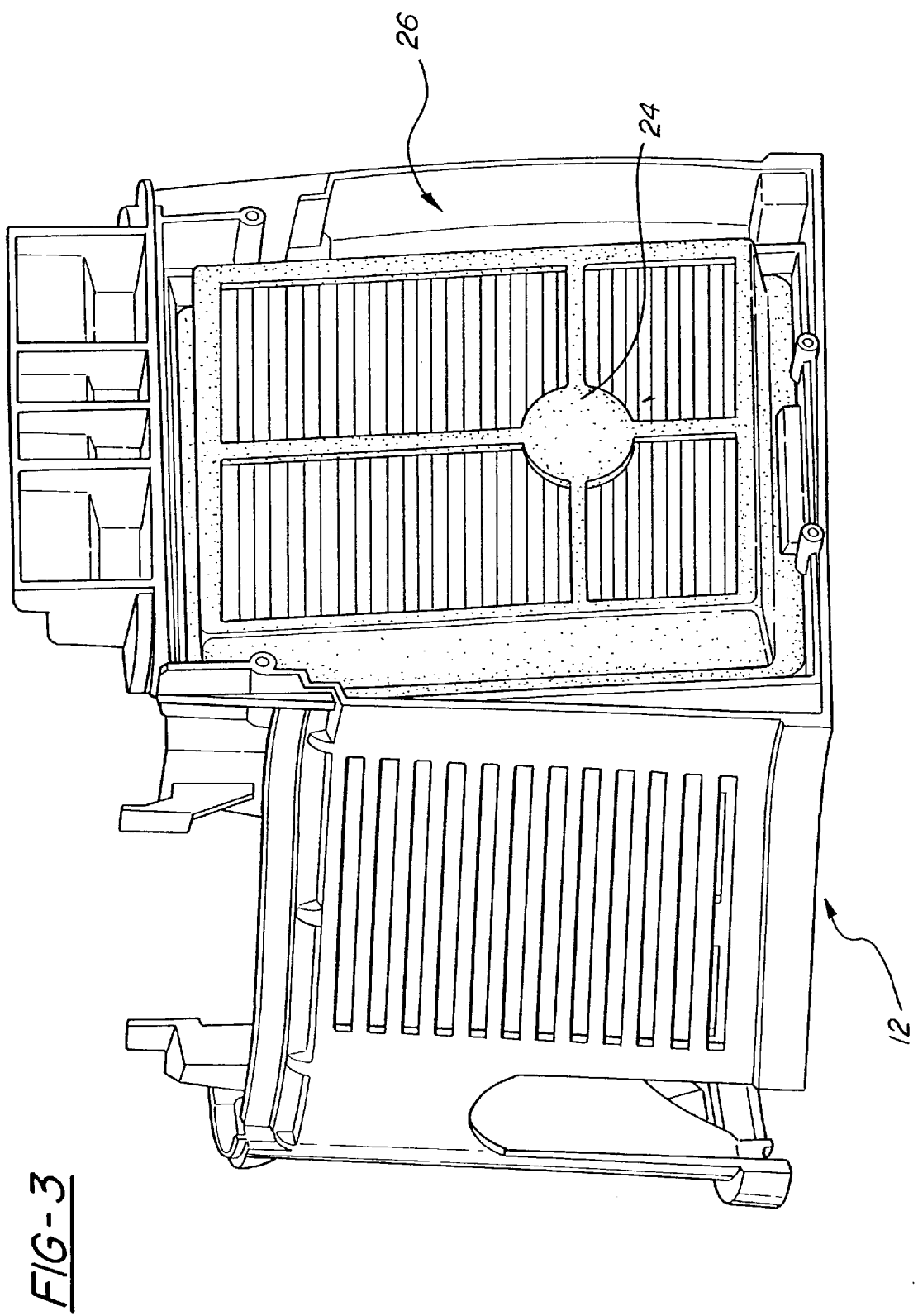
FIG. 3 is an elevational view of the vacuum cleaner main housing shown with the second filter seated in the recess defined by the housing.

FIG. 2 shows an exploded view of the vacuum cleaner assembly 10. The second filter 24 is secured in place by a rear cover 28 which is removably attached to the main housing 12 to cover the opening of the recess 26 and secure the second filter 24 in place. The rear cover 28 includes a stowage device 30 for stowing an electrical cord. A foam seal 34 is disposed between the second filter 24 and the rear cover 28 to firmly secure the second filter 24 and prevent air from escaping around the second filter 24. The second filter 24 has smaller openings than the separator filter 22 for capturing microscopic dirt and dust particles that escape the water bath filter 20 and the separator filter 22. In the preferred embodiment, the second filter 24 is a HEPA filter for capturing tiny microscopic dust and dirt particles.

The vacuum cleaner assembly includes a water bath pan 36 for containing the water bath 20. The water bath pan 36 presents a first opening 38 which is disposed directly below the main housing 12 which has a bottom opening 39 that corresponds to the first opening 38 in the water bath pan 36. A foam seal 40 forms a sealed engagement between the water bath pan 36 and the bottom opening 39 of the main housing 12. The water bath pan 36 also includes a second opening 42 which corresponds to a tubular member extending from an inlet face plate 44. The foam seal 40 forms a sealed engagement between the second opening 42 in the water bath pan 36 and the inlet face plate 44. The inlet face plate 44 is mounted to the main housing 12 at the inlet 14 and allows attachments to be connected in direct communication with the inlet 14.

The motor 17a is centrally supported by support rings 18 in the main housing 12 above the bottom opening 39. The separator 22 is attached to the motor 17a below the blower 17c and extends downwardly through the bottom opening 41 in the main housing 12 and the first opening 38 in the water bath pan 36. The separator 22 is rotated by the motor 17a for circulating the air within the water bath pan 36 and for drawing the dust and dirt entrained air, along with water from the water bath 20, within the separator 22 for further capture of debris in the water bath 20 and to direct, by centrifugal force, the water and any remaining dirt or dust back outward into the water bath pan 36 for additional separation as it is drawn within the separator 22 again. As the dust, dirt, and water are forced outward from the separator by centrifugal force, the filtered air is drawn upward out of the separator 22 outwardly through the second filter 24.

A dolly 46 is positioned below the water bath pan 36. The water bath pan 36 attaches to the main housing 12 with at a pair of latches 47 to secure the water bath pan 36 to the main housing 12. The main housing 12 attaches to the dolly 46 and is held securely in place by a latch which is released upon activation of a release button 49. An interlock switch 48 is mounted to the main housing 12 and detects the presence of the water bath pan 36 when the dolly 46 is assembled to the main housing 12. The dolly 46 includes a seat 51 for the main housing and casters 50 are mounted to the dolly 46 to provide movable support for the vacuum cleaner assembly 10. The vacuum cleaner assembly 10 also includes a top cover 52 with a handle attached to the top of the main housing 12 to close off the top and cover the motor 17a, cooling fan 17b, support rings 18, and blower 19. The top cover 52, main housing 12, and dolly 46 when assembled enclose all inner components of the vacuum cleaner assembly 10.

The invention has been described in an illustrative manner, and it is to be understood that the terminology which has been used is intended to be in the nature of words of description rather than of limitation.

Modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A vacuum cleaner assembly comprising:

a main housing having an inlet, a recess, and a single outlet disposed within said recess, a water bath filter coupled to said main housing and disposed between said inlet and said single outlet for filtering particles of dust and dirt from the air prior to exhausting the air outwardly through said single outlet, a second filter removably disposed adjacent said main housing single outlet and within said main housing recess, and a rear cover removably connected to said main housing to secure said second filter within said main housing recess, said rear cover having a single exit vent.

2. An assembly as set forth in claim 1 wherein said second filter has small openings for capturing microscopic dirt and dust particles that escape said water bath filter.

3. An assembly as set forth in claim 1 wherein said second filter is a HEPA filter.

4. A vacuum cleaner assembly comprising:

a main housing having an inlet, a recess, and a single outlet disposed within said recess, said main housing having a generally circular shape, wherein said inlet and single outlet are disposed on opposite sides of said main housing;

a water bath filter coupled to said main housing and disposed between said inlet and said single outlet for filtering, particles of dust and dirt from the air prior to exhausting the air outwardly through said single outlet, and a second filter disposed adjacent said main housing single outlet and within said main housing recess.

5. An assembly as set forth in claim 4 wherein the air flow path from said inlet to said singe outlet is substantially liner.

6. An assembly as set forth in claim 4 further comprising a rear cover removably connected to said main housing to secure said second filter within said main housing recess, said rear cover having a single exit vent.

7. A vacuum cleaner in accordance with claim 4, wherein said second filter is a HEPA filter.

8. A vacuum cleaner in accordance with claim 4, further comprising means for replacing the second filter without removing the water bath.

9. A vacuum cleaner in accordance with claim 4, further comprising means for removal and replacement of the second filter solely from the outside of the housing.

10. A vacuum cleaner assembly comprising:

main housing having an inlet, a recess, and a single outlet disposed within said recess, a water bath filter coupled to said main housing and disposed between said inlet and said single outlet for filtering particles of dust and dirt from the air prior to exhausting the air outwardly through said single outlet, a second filter removably disposed in the outlet path of the air passing through said main housing in said recess and positioned adjacent said main housing and covering said single air outlet for additional filtering of the air, and a rear cover comprising a single component that is removably attachable to said main housing for securing said second filter adjacent said main housing, said rear cover covering said main housing recess and having a single air exit vent.

11. A vacuum cleaner assembly comprising:

a main housing having an inlet, a recess, and a single outlet disposed within said recess, a water bath filter coupled to said main housing and disposed between said inlet and said single outlet for filtering particles of dust and dirt from the air prior to exhausting the air outwardly through said single outlet, a second filter removably disposed in the outlet path of the air passing through said main housing and positioned directly adjacent said main housing and covering said single air outlet for additional filtering of the air, and a rear cover removably attachable to said main housing for securing said second filter directly adjacent to said main housing, said rear cover has a single air exit vent.

12. A vacuum cleaner assembly comprising:

a main housing having an inlet, a recess, and a single outlet disposed within said recess, a water bath filter coupled to said main housing and disposed between said inlet and said single outlet for filtering particles of dust and dirt from the air prior to exhausting the air outwardly through said single outlet, a second filter removably disposed in the outlet path of the air passing through said main housing and positioned directly adjacent said main housing covering said single air outlet, said second filter having a first side and a second side wherein said first side is positioned directly adjacent said main housing, and a rear cover comprising a single component and having an outer periphery that is removably attachable to said main housing and a single air exit outlet, said outer periphery removably secures directly adjacent said main housing, said rear cover secures said second filter directly adjacent to said main housing and said second filter second side is positioned directly adjacent said rear cover single air exit outlet.

13. A vacuum cleaner assembly comprising:

a main housing having an inlet, a recess, and a single outlet disposed within said recess, a water bath filter coupled to said main housing and disposed between said inlet and said single outlet for filtering particles of dust and dirt from the air prior to exhausting the air outwardly through said single outlet, a second filter removably disposed in the outlet path of the air passing through said main housing and positioned directly adjacent said single air outlet, and a rear cover removably attachable to said main housing for securing said second filter to said main housing and said rear cover having a single air exit outlet, second filter is positioned directly adjacent said rear cover single air exit outlet.

* * * * *